United States Patent [19]
Bond et al.

[11] Patent Number: 5,517,531
[45] Date of Patent: May 14, 1996

[54] KERNEL ADAPTIVE INTERFERENCE SUPPRESSION SYSTEM

[75] Inventors: James W. Bond; David J. Marchette, both of San Diego, Calif.; Carey E. Priebe, King George, Va.; Thomas W. Schlosser, San Diego, Calif.

[73] Assignee: The United States of America as represented by the Secretary of the Navy, Washington, D.C.

[21] Appl. No.: 707,352

[22] Filed: May 29, 1991

[51] Int. Cl.$^6$ ................................................ H04B 1/10
[52] U.S. Cl. .................... 375/350; 375/346; 375/349; 455/63; 455/67.3; 364/724.12
[58] Field of Search .................. 455/50.1, 63, 67.3; 375/99, 102, 103, 200–210, 346, 349, 350; 364/724, 12

[56] References Cited

U.S. PATENT DOCUMENTS 4,408,332  10/1983  Sari ........................................ 375/99 X

OTHER PUBLICATIONS

J. Bond et al, *Adaptive Locally Optimum Detection Based Upon Kernel Estimation;* (Technical Report 1307; Aug. 1989; Naval Ocean Systems Center).

Primary Examiner—Bernarr E. Gregory
Attorney, Agent, or Firm—Harvey Fendelman; Thomas Glenn Keough; Peter A. Lipovsky

[57] ABSTRACT

An interference suppression system utilizes an adaptive locally optimum detection algorithm derived from kernel estimation. By utilizing this algorithm in the processor of the invention, fewer receive samples are required to obtain useful estimates of required probability density functions. The new adaptive locally optimum detection algorithm is useable in applications involving very high sampling rates and is thus suitable for rapidly and radically changing interference environments encompassing a wide range of frequencies.

9 Claims, 14 Drawing Sheets

KERNEL ADAPTIVE INTERFERENCE SUPPRESSION SYSTEM

STATEMENT OF GOVERNMENT INTEREST

The invention described herein may be manufactured and used by or for the Government of the United States of America for governmental purposes without the patent of any royalties thereon or therefor.

DOCUMENT INCORPORATED BY REFERENCE

The following document is hereby incorporated by reference into this specification:

Silverman, B. W., *Density Estimation for Statistics and Data Analysis*, 1986, Chapman and Hall, New York, N.Y.

BACKGROUND OF THE INVENTION

1. Field of the Invention

The invention relates generally to the suppression interference amongst communication signals. More particularly, the invention relates to the implementation of statistical techniques to interference suppression.

2. Description of the Related Art

Radios may receive three forms of signals: noise, interference and communication. Noise, created in the atmosphere due to natural causes such as lightning and the like, is unpredictable. Few steps are taken towards elimination. Interference signals can be caused such as by several stations broadcasting on the same band, or can be caused deliberately, such as by an adversary transmitting signals to mask communication signals. Many techniques have been devised to combat interfering signals.

As major sources of radio interference are non-Gaussian in structure, one such technique for detecting communication signals in the presence of non-Gaussian interference has been known to employ algorithms that estimate the statistics of this interference. This estimate is then used to transform received radio signals into perceptible communication signals.

One statistical technique creates a probability density function (PDF) from discrete data. This method creates a transform for continuous data based upon the derivative of the natural log of the PDF of a magnitude, such as signal amplitude. Researchers have estimated the PDF of signal amplitudes of interfering signals by creating histograms of received data. These researchers then used finite difference operations to estimate required derivatives.

The histogram approach is known to be numerically unstable and, to be satisfactory, requires that a relatively great number of signal samples be taken. This high sample requirement makes the histogram approach computationally demanding and confines its use mainly to dedicated microprocessors, and then for those used with radios operating in the lower portion of the radio frequency spectrum (low frequency (LF), very low frequency (VLF) and extra low frequency (ELF)). In higher frequency ranges, sufficient sampling becomes extremely difficult.

In environments in which interference characteristics are radically and rapidly changing, the necessity to collect a large number of samples over time makes alternative approaches to the histogram technique worth investigating.

There is thus a need for an interference suppression system that can be used with dedicated or nondedicated microprocessors, that is suitable for use with radio receivers operating over both the lower and upper portions of the radio frequency spectrum and that can provide satisfactory interference suppression in radically and rapidly changing interference environments.

SUMMARY OF THE INVENTION

The invention meets these needs through a novel way of implementing interference suppression for use with radio receivers. The invention uses the efficient technique of kernel estimation developed by mathematical statisticians to approximate PDFs from a relatively few number of data samples.

The processor of the invention implements an Adaptive Locally Optimum Detection (ALOD) algorithm created especially for interference suppression. The algorithm forms the basis of operation of the invention and uses kernel estimation to attempt to represent the probability density function of a random variable (interference) based upon a finite number of data points (signal samples). In this technique, each sample is viewed as defining a kernel function about the sample, with the PDF being an average of the kernel functions.

To separate interference from communication signals, the kernel algorithm is used to recursively calculate a gain factor from received signal samples spanning the sample of interest to be multiplied. The gain factor is then multiplied times the received signal samples.

By using kernel estimation rather than a histogram approach, the processor of the invention requires only about one tenth as many signal samples to obtain useful estimates of the probability density functions necessary to successfully suppress interference. As a result, the invention can respond faster to changing interference environments and can be used in applications demanding very high sampling rates.

OBJECTS OF THE INVENTION

It is an object of the invention to provide an improved interference suppression system.

Another object of the invention is to provide an interference suppression system that can be implemented through the use of dedicated or nondedicated microprocessors.

A further object of the invention is to provide an improved interference suppression system that is operable in both the lower and upper portions of the radio frequency spectrum.

Yet a further object of the invention is to provide an interference suppression system that permits satisfactory results in radically and rapidly changing interference environments.

Other objects, advantages and new features of the invention will become apparent from the following detailed description of the invention when considered in conjunction with the accompanying drawings.

DESCRIPTION OF THE PREFERRED EMBODIMENT

Figure 1:
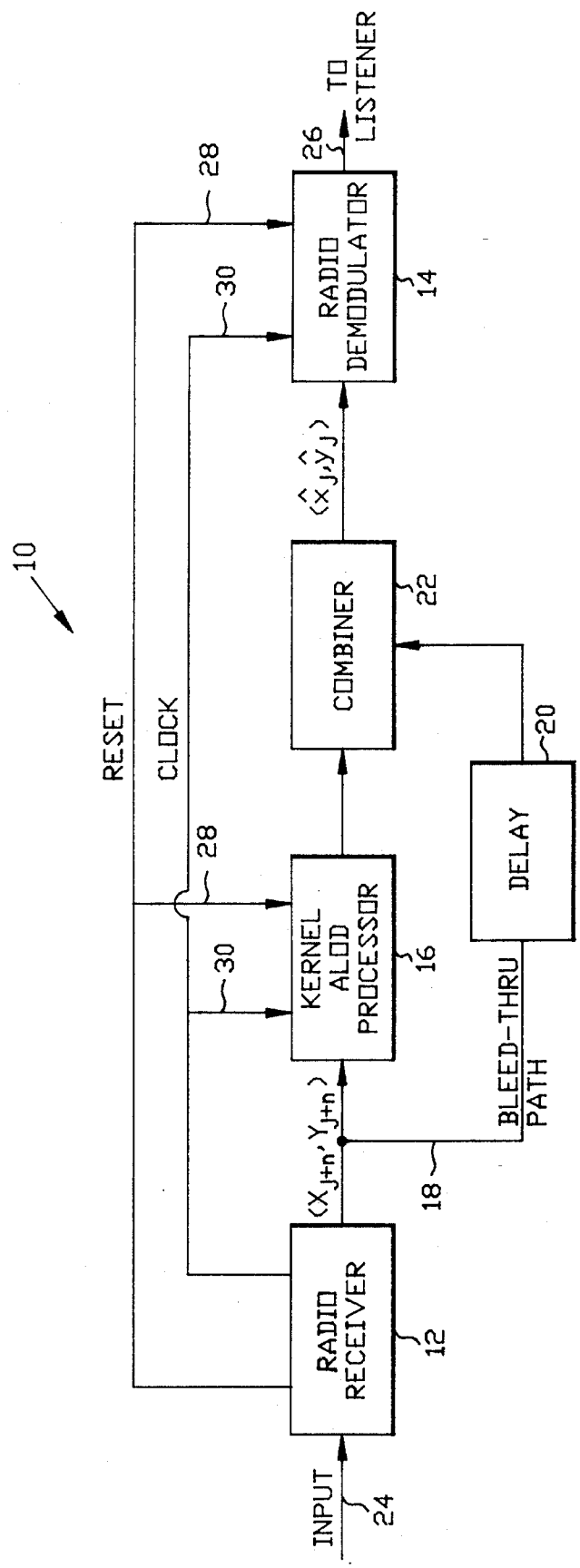
FIG. 1 is a block diagram of an interference suppression system according to the invention.

In FIG. 1 there is shown an interference suppression system 10 according to a preferred embodiment of the invention. System 10 includes components of a typical radio including a receiver 12 and a demodulator 14. A Kernel Adaptive Locally Optimum Detection (ALOD) interference processor 16 according to the invention is inserted between receiver 12 and demodulator 14 preferably as a stand-alone unit. Alternatively, hardware components of processor 16 could be housed on a card that could be inserted into a vacant slot of radio 12. If this alternative embodiment is utilized processing can be implemented either before or after demodulation.

To provide satisfactory performance in cases where interfering noise is primarily Gaussian, Kernel ALOD Processor 16 should be used in conjunction with a bleed-through path 18. This path includes a delay 20 that equals the delay-through processor 16. Signals delayed through bleed-through path 18 and those output from processor 16 are normalized and combined conventionally in combiner 22. Normalization in this regard is with respect to the relative energies from processor 16's output and from those passed through bleed-through path 18, these energies being averaged over the received signal samples used in the processor.

Bleed-through path 18 and combiner 22 are needed for the invention to work properly in cases where communication signals are nearly as strong or are stronger than noise and interference. This path is constantly employed and has little effect on system operation until the described conditions take place.

A preferred embodiment of the invention is designed for the reception of band-spread signals having each information bit spread by a factor of 10 or more. Of course, other spread factors may be used. For the invention to be usable, radio 12 must include a bypass of processor 16 for reception of communication signals which are not spread. This bypass, not shown, may be constructed according to conventional techniques.

Radio receiver 12 converts input signals 24 into a sequence of in-phase and quadrature samples, designated here as $\{x_j\}$ and $\{y_j\}$, respectively, with j being an arbitrary index. The input pair $(x_j,y_j)$ is called a complex sample of the received signal for index j and can be viewed as a vector with x-component $(x_j)$ and y-component $(y_j)$. Signals $x_j$ and $y_j$ are the centermost pair of a representative number (2n+1) receive signal samples taken: $(x_{j-n}, y_{j-n}) \ldots (x_j, y_j) \ldots (x_{j+n}, y_{j+n})$. The preferred sample rate is twice the bandwidth of the baseband communication signal component received by the radio.

Demodulated output 26 of system 10 is of a sequence of "transformed" in-phase and quadrature samples designated as $\{x_j^{\wedge}\}$ and $\{y_j^{\wedge}\}$, respectively. A reset signal 28 and a clock signal 30 are used to synchronize operation of processor 16 with radio receiver 12 and demodulator 14. Let $r_j^2 = x_j^2 + y_j^2$ with $r_j \geq 0$ and being a magnitude of a receive sample $(x_j, y_j)$. The processor shown in FIG. 1 forms a gain factor $g(r_j)$ which relates the input sequence $\{x_j, y_j\}$ to demodulated output sequence 26 $\{x_j^{\wedge}, y_j^{\wedge}\}$ by the relation $$(x_j^{\wedge}, y_j^{\wedge}) = g(r_j)(x_j/r_j, y_j/r_j).$$

The gain factor $g(r_j)$ is not only a function of $r_j$ but is also a function of $(r_k|j-n \leq k \leq j+n)$, with 2n+1 being the representative number of samples used in the ALOD algorithm of processor 16. As will be further discussed, a value of n equaling a power of two has been found to make implementation of the invention easy while providing satisfactory results. However, n is an arbitrary number that may be adjusted according to user demand and results achieved.

The processing taking place in the invention delays output 26 relative to input 24 by n samples. Demodulator 14 should be modified in a conventional way to account for this delay to allow for the despreading of processed communication signals.

Figure 2:
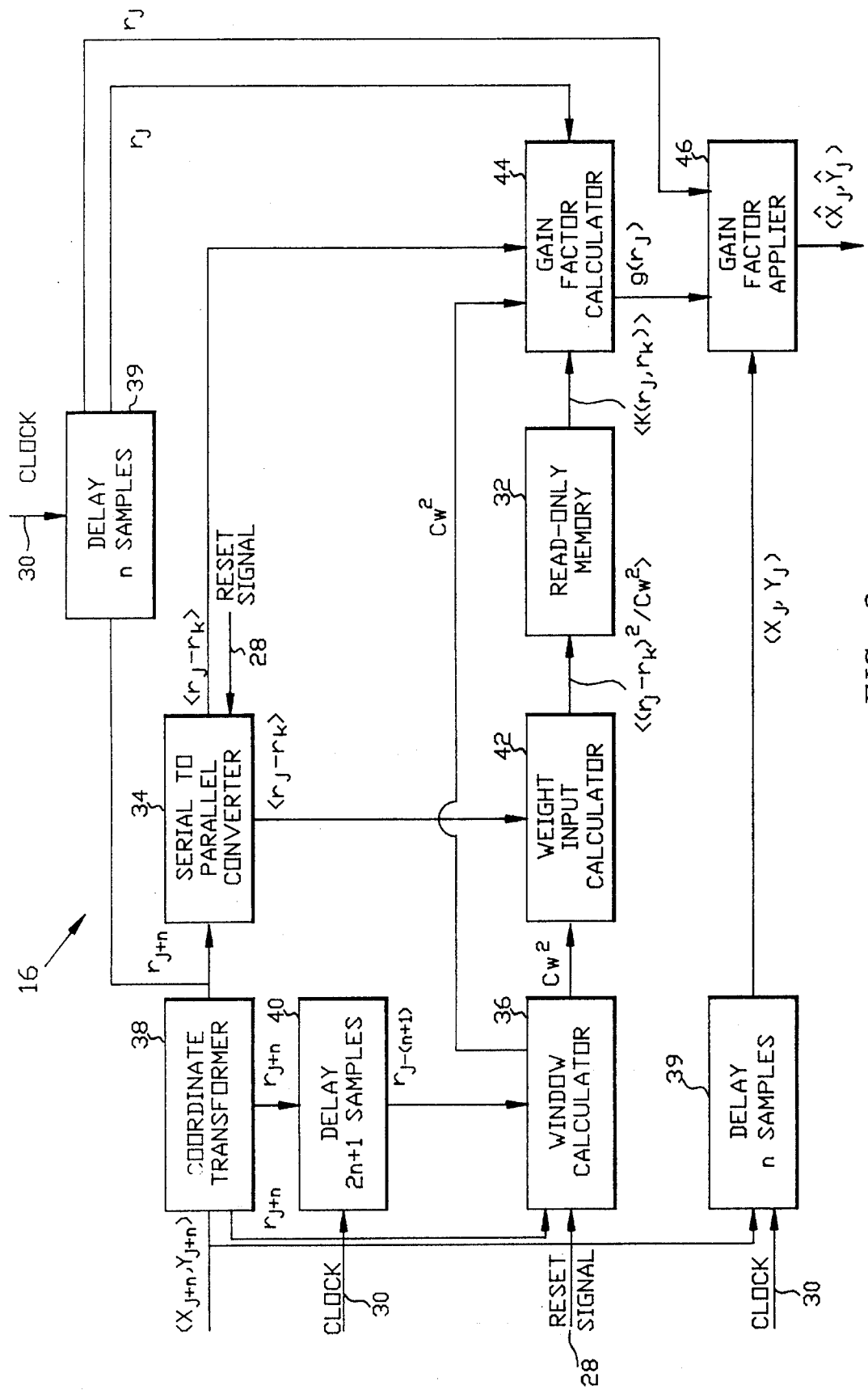
FIG. 2 is a representative implementation of a processor according to the invention.

In FIG. 2 there is provided a general block diagram of kernel ALOD processor 16, showing the major components of the processor. In the preferred embodiment shown, all input and output quantities are 16-bit integers and all calculations performed by the components of the processor of the invention are done with 16-bit precision. Of course, those skilled in the art will realize that these quantities may be changed dependent upon component availability, computation time required and/or other factors.

The operation of the different components of processor 16 are synchronized through the use of clock signal 30 derived from the internal clock of radio receiver 12 shown in FIG. 1. In the embodiment described, read-only memory 32 is clocked at 2n times the speed of other components in processor 16. Should this clock speed become a limiting factor, read-only memory 32 may be replaced by other memory, such as by discrete memory, clocked at the same or at a different rate as other components of the processor.

Reset signal 28 is sent to only two components of processor 16, serial-to-parallel converter 34 and window calculator 36.

The invention will be described at three levels. First, the inputs and outputs will be described for each major functional block of FIG. 2. Second, the hardware and functions of each block, whose properties are not apparent, will be described. Third, a flow chart procedure will be described outlining processing steps taking place in the invention.

The inputs and outputs of each of the major functional blocks show in FIG. 2 are given below.

Coordinate Transformer (38):
  Input: $(x_{j+n}, y_{j+n})$
  Output: $r_{j+n} = \sqrt{x_{j+n}^2 + y_{j+n}^2}$ The "j+n"th sample pair is the most recently acquired sample and is shown as the input into processor 16. Since the invention cancels interference based upon properties of the received signal samples, such as signal amplitudes, coordinate transformer 38 is used to calculate these amplitudes.

Window Calculator (36):
  Inputs: $r_{j+n}$, $r_{j-(n+1)}$, reset signal
  Output: $Cw^2$ The constant C used throughout this specification is a scaling factor. By trial and error it has been found that C=1 works well for a very low frequency (VLF) environment. However, there is no theoretical basis for this choice of window so that the invention permits an empirical determination of C.

Window calculator 36 provides an estimation of the variance, the square of the standard deviation of the received samples, of the probability density functions (PDF) calculated by processor 16. Reset signal 28 is used to restart the estimation process when an operably coupled radio is tuned to a new frequency.

Serial-to-Parallel Converter (34):
  Input: the sequence of sample magnitudes $\{r_j\}$ input over time, reset signal
  Output: a sequence of vectors centered about the sample magnitude $r_j$ over time, which is written as $$<r_j - r_k> = (r_j - r_{j-n}, r_j - r_{j-(n-1)}, \ldots, r_j - r_{j-1}, r_j - r_{j+1}, \ldots r_j - r_{j+n})$$

in which throughout this specification the symbols "<>" designate a vector form of the received signals with the symbol "k" being a running index based upon j that runs from j−n to j+n unless otherwise noted. This sequence of signal magnitude differences, in this case amplitude-differences, is used to calculate the transform to be applied to time delayed sample pair $(x_j, y_j)$ from delay 39.

In a preferred embodiment of the invention the integer n is a power of 2. Though making n a power of 2 is not mandatory, this selection makes implementation of the invention practical. It has been found that useful versions of the invention have resulted for values of n=4, 8, 16 and 32.

Reset signal 28 is used to restart the processing of the sequence of signal magnitudes (amplitudes) within Serial-to-parallel Converter 34 when radio receiver 12 and radio demodulator 14 of FIG. 1 are tuned to a new frequency.

Weight Input Calculator (42):
  Input: $Cw^2$, $<r_j-r_k>$
  Output: $<(r_j-r_k)^2/Cw^2>$ Read-only Memory (32):
  Input: $<(r_j-r_k)^2/Cw^2>$
  Output: $<K(r_j, r_k)> = <e^{-f(r_j, r_k)}>$ with $f(r_j, r_k) = (\frac{1}{2})[(r_j-r_k)^2/Cw^2]$ and k=j−n to j+n.

The vector of kernels, $<K(r_j, r_k)>$, summarizes the statistical information regarding the magnitudes (amplitudes) of the signal being received from the 2n+1 samples centered on sample $r_j$. This information allows the received signal sample pairs to be transformed to suppress interference.

Gain Factor Calculator (44):
  Inputs: $<r_j-r_k>$, $<K(r_j, r_k)>$, $r_j$, $Cw^2$
  Output: gain factor $g(r_j)$ This gain factor is given by the relation:

$$\left\{ \sum_k [-((r_j - r_k)/Cw^2)(K(r_j, r_k))] / \sum_k [K(r_j, r_k)] \right\} - 1/r_j.$$

The notation $$\sum_k [\ ]$$

means to sum the quantity enclosed by the brackets over the integers from k=j−n to k=j+n.

Gain Factor Applier (46):
  Input: $g(r_j)$, $(x_j, y_j)$, $r_j$
  Output: $(x_j\hat{\ }, y_j\hat{\ }) = (g(r_j)x_j/r_j, g(r_j)y_j/r_j)$ The gain factor applier applies the transforms computed in the invention to received signal samples.

The hardware and operation of each of the major components shown in FIG. 2, whose properties are not otherwise apparent, will now be described. The components shown are assembled from conventional elements according to traditional techniques.

Figure 3:
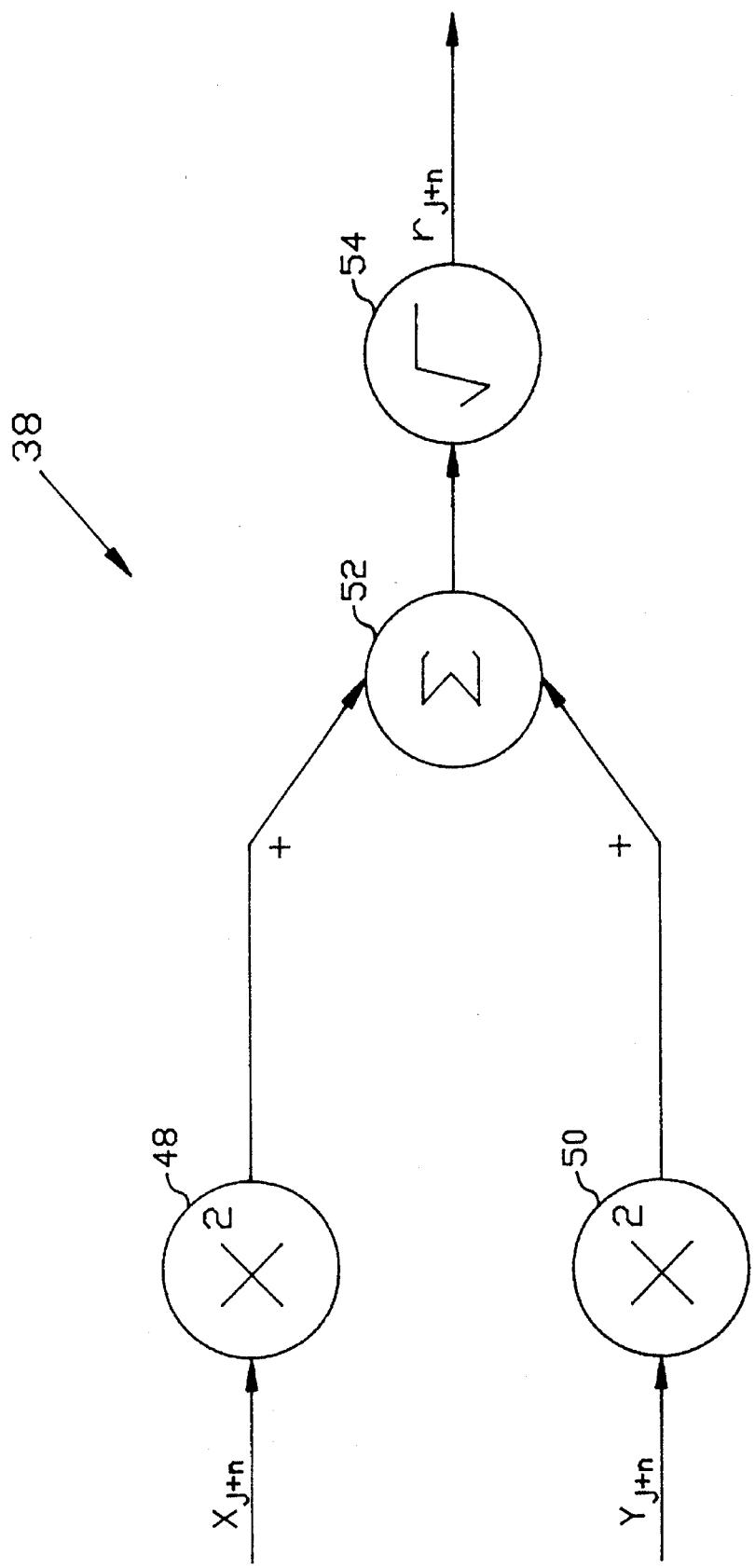
FIG. 3 is a block diagram of a coordinate transformer such as may be used in the processor of the invention.

Coordinate Transformer (38):
A detailed view of Coordinate Transformer is shown in FIG. 3. The $(x_{j+n}, y_{j+n})$ components of the most-recently acquired input sample pair go to squaring circuits 48 and 50, respectively. The squaring circuit outputs are added in adder 52 and the square root taken in square root processor 54 to give the magnitude (amplitude) $r_{j+n}$ of the most recently acquired received signal sample.

Figure 4:
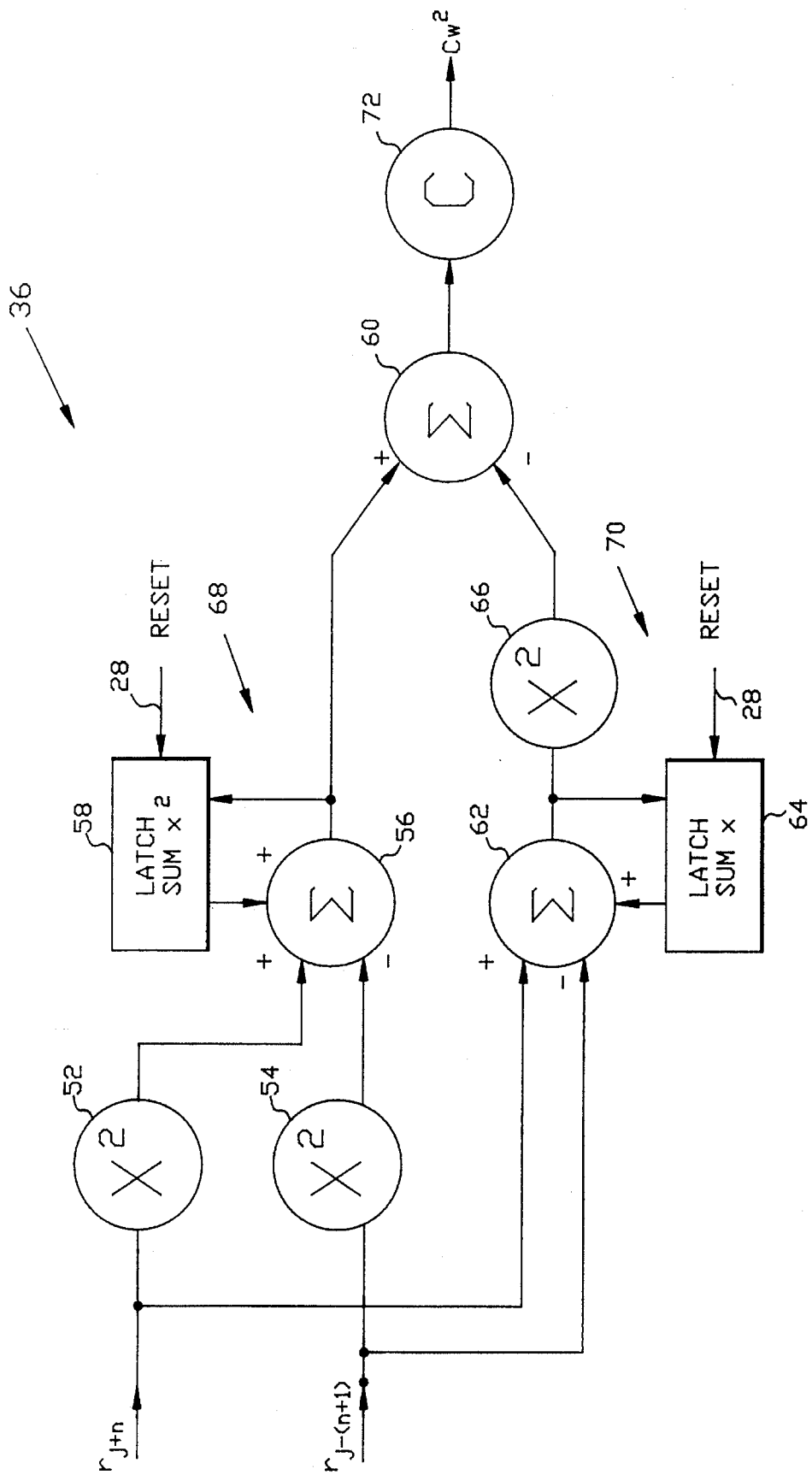
FIG. 4 is a block diagram of a window calculator such as may be used in the invention.

Window Calculator (36):
A detailed view of Window Calculator 36 is shown in FIG. 4. In operation, the variance (the square of the standard deviation of the received samples) is calculated recursively within Window Calculator 36. As can be seen in FIG. 2, the $(r_{j+n})$th receive sample magnitude from Coordinate Transformer 38 is simultaneously input to Serial-to-parallel Converter 34 and to Window Calculator 36. At this time, an output of 2n+1 sample delay 40, sample $r_{j-(n+1)}$, is also input to Window Calculator 36. In FIG. 4 it can be seen that samples $r_{j+n}$ and $r_{j-(n+1)}$ are input into squaring circuits 52 and 54, respectively. The output of squaring circuit 52 is added to the negative of the output of squaring circuit 54 in summer 56. Summer 56's output is latched into latch 58 as "sum $X^2$" and is also passed to summer 60, as will be further discussed.

Receive amplitude samples $r_{j+n}$ and $r_{j-(n+1)}$ are also routed to summer 62 where the positive and negative values of these samples, respectively, are added. The output of summer 62 is latched within latch 64 as "sum X" and also passed to squaring circuit 66. The positive and negative values of sum $X^2$ circuit 68 and (sum X)$^2$ circuit 70, respectively, are added in summer 60 and are multiplied by constant C (block 72) to give estimated variance $Cw^2$.

In operation, Window Calculator 36 stores the last used "sum $X^2$" and "sum X" values. These values were used to estimate a window employed in calculating a previously employed gain factor. These values are then updated by using the samples $r_{j+n}$ and $r_{j-(n+1)}$ in the following manner:

$$\text{sum } X^2_{new} \rightarrow \text{sum } X^2_{old} + r_{j+n}^2 - r_{j-(n+1)}^2$$

$$\text{sum } X_{new} \rightarrow \text{sum } X_{old} + r_{j+n} - r_{j-(n+1)}.$$

An estimate of the variance of the receive signals is then obtained by forming:

$$\text{sum } X^2 - (\text{sum } X)^2.$$

Reset signal 28 is routed to latches 58 and 64, holding values "sum $X^2$" and "sum X" respectively, to set their contents to 0. This restarts the process of estimating the variance of the signal amplitude values when the radio coupled to the invention is tuned to a new frequency.

The output $Cw^2$ of Window Calculator 36 is C times the calculated variance, where C is the previously mentioned scaling factor.

Figure 5:
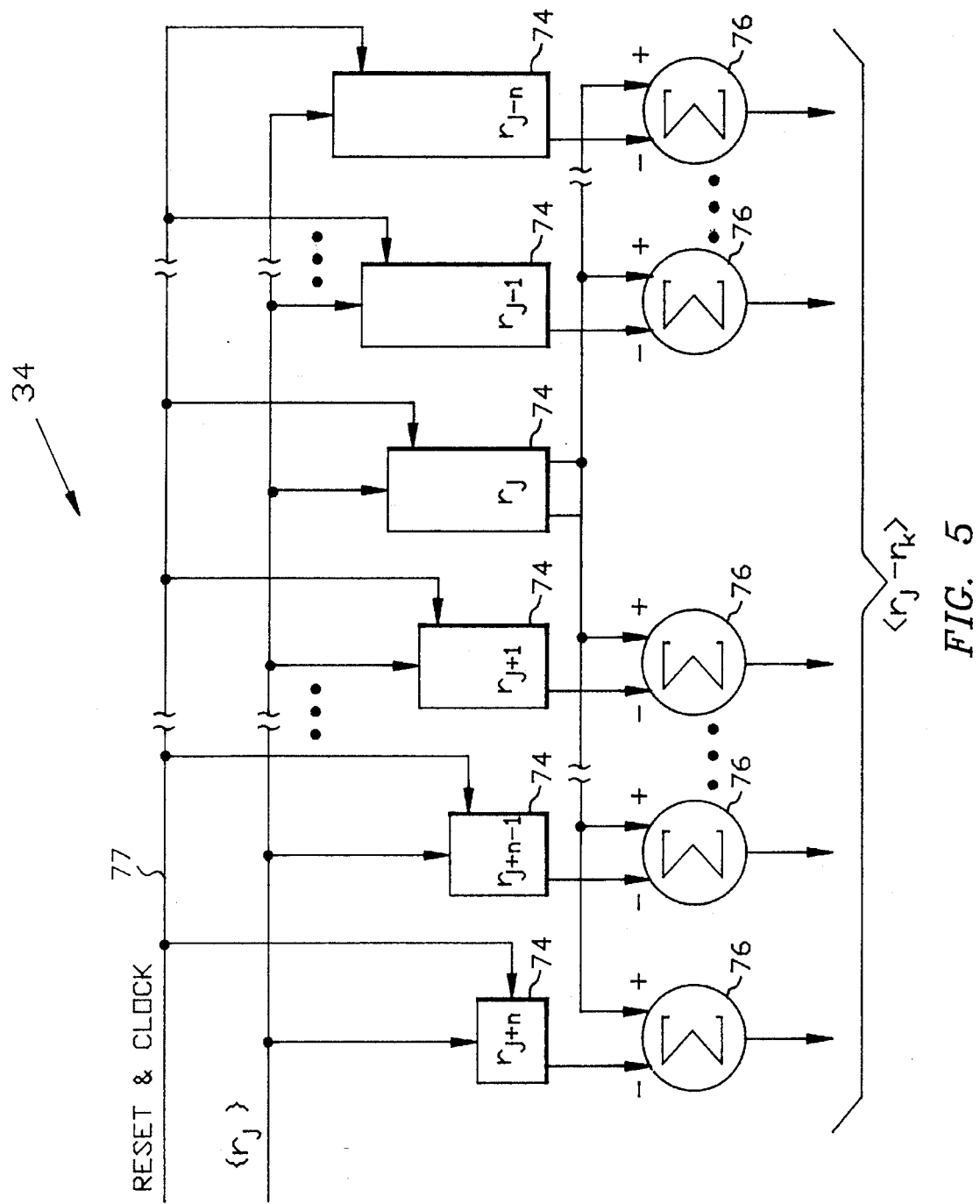
FIG. 5 is a block diagram of a serial-to-parallel converter such as may be used in the invention.

Serial-to-Parallel Converter (34):

Serial-to-parallel Converter 34 of FIG. 2 is shown in detail in FIG. 5. Recall that the input to Serial-to-parallel Converter 34 is the sequence of signal magnitudes (amplitudes) $\{r_j\}$ and the output of the converter being the sequence of vectors centered about the sample magnitude $r_j$:
$<r_j-r_k> = (r_j-r_{j-n}, r_j-r_{j-(n-1)}, \ldots r_j-r_{j-1}, r_j-r_{j+1}, \ldots r_j-r_{j+n})$.
This sequence of vectors has 2n terms and is formed by subtracting the center input magnitude (amplitude), $r_j$, from the n magnitudes on each of its sides.

The structure of Serial-to-parallel Converter 34 is shown in FIG. 5. The converter contains 2n+1 shift registers 74 of lengths 1 through 2n+1. The outputs of shift register 74 are fed to 2n adders 76 to create the differences $r_j-r_k$, k=j−n, . . . , j−1, j+1, . . . , j+n.

Line 77 includes reset signal 28 to reset the contents of each of the 2n+1 shift registers to zeros. This reinitializes the data used to estimate the ALOD transform when a radio utilizing the processor of the invention is tuned to a new frequency.

Figure 6:
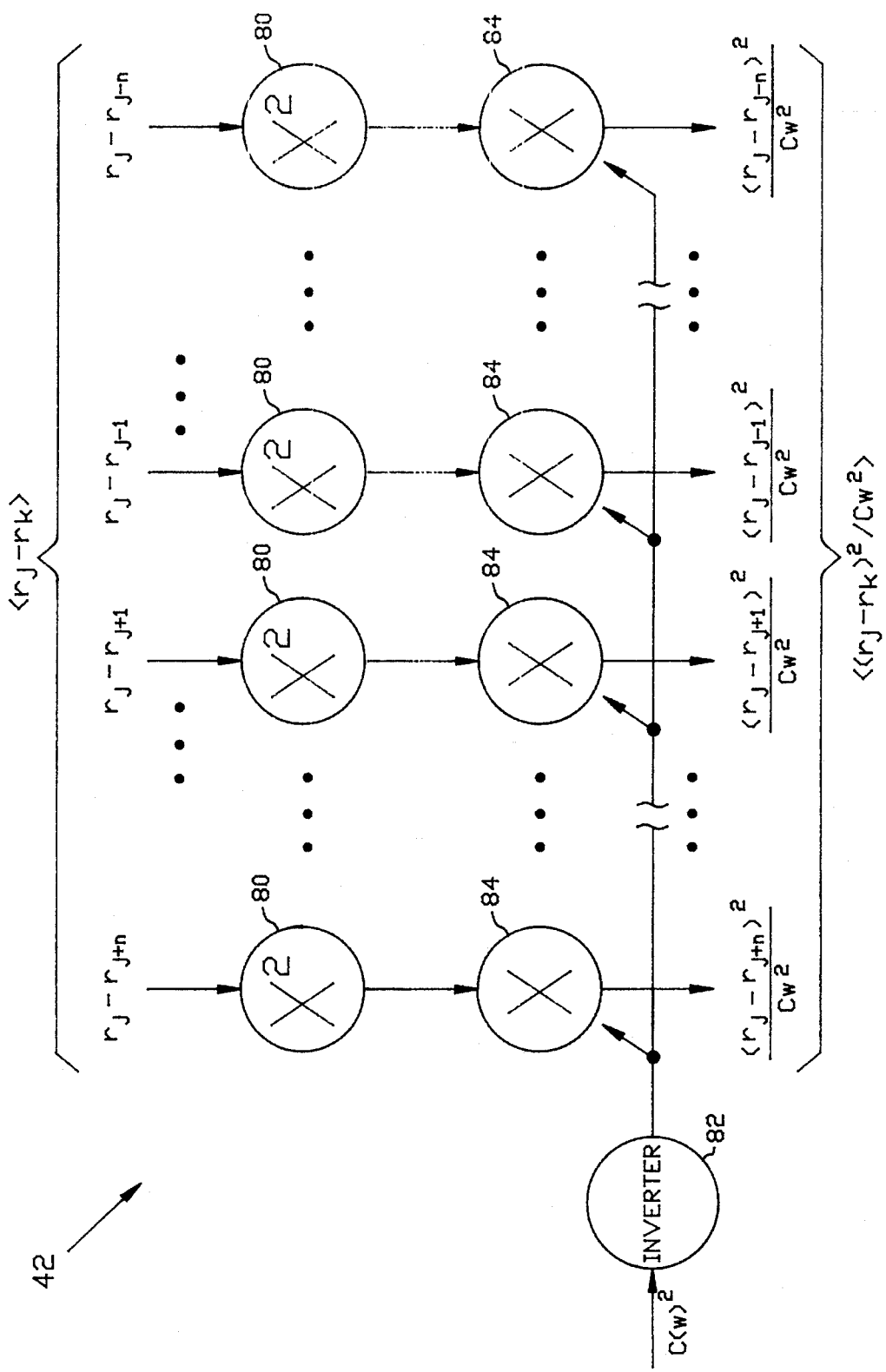
FIG. 6 is a block diagram of a weight input calculator as may be used in the invention.

Weight Input Calculator (42):

Weight Input Calculator 42 of FIG. 2 is shown in detail in FIG. 6. The output of Serial-to-parallel Converter 34, the sequence of vectors centered about the sample magnitude $r_j$ ($<r_j-r_k>$) and the output of Window Calculator 36, estimated variance ($Cw^2$), are the inputs to Weight Input Calculator 78. The components of input vector $<r_j-r_k>$ are presented to 2n parallel squarers 80, the outputs of which are then multiplied by the inverted form of the input $Cw^2$ by way of invertor 82 and multipliers 84. These steps produce a sequence of normalized vectors:

$$<(r_j-r_k)^2/Cw^2>.$$

Read-only Memory (32):

Referring to FIG. 2, the components of $<(r_j-r_k)^2/Cw^2>$ in turn address Read-only Memory (ROM) 32 in which is stored an array of values for the function $\exp(-x)$, where x equals 0 to some predetermined positive constant. The value for this constant, and the granularity of this table of values should be determined by the user, but it has been found that a value of x=100 with 10,001 values in the table, each 0.01 apart has proven to be satisfactory for purposes of the invention. The process within ROM 32 of FIG. 2 produces the components of the vector:

$$<e^{-(1/2)(r_j-r_k)^2/Cw^2}> = <K(r_j,r_k)>.$$

Figure 7:
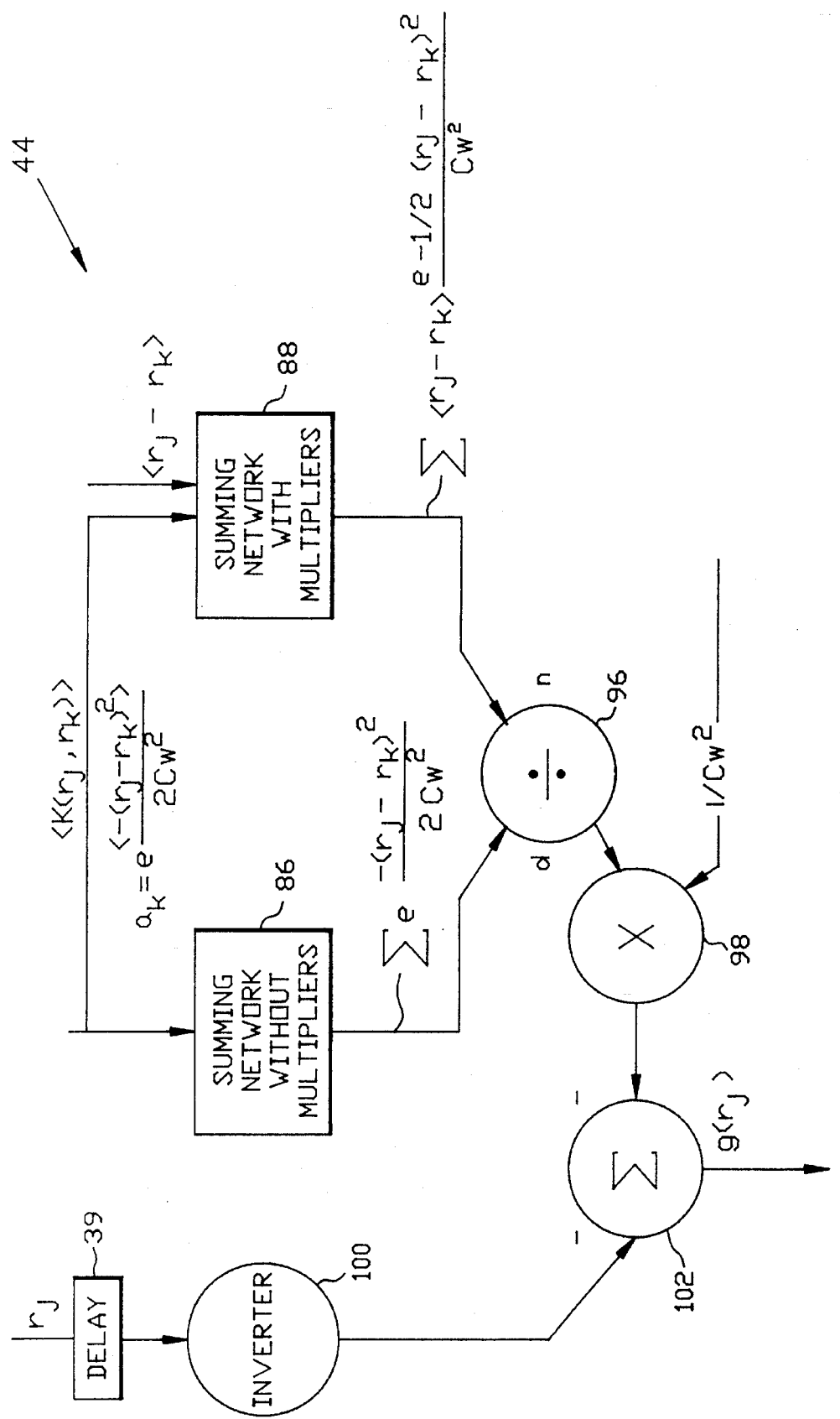
FIG. 7 illustrates a gain factor calculator such as may be utilized in the invention.

Gain Factor Calculator (44):

The overall structure of Gain Factor Calculator 44 shown generally in FIG. 2 is shown in detail in FIG. 7. The calculator uses two summing networks 86 and 88 shown in FIGS. 8 and 9, respectively.

Figure 8:
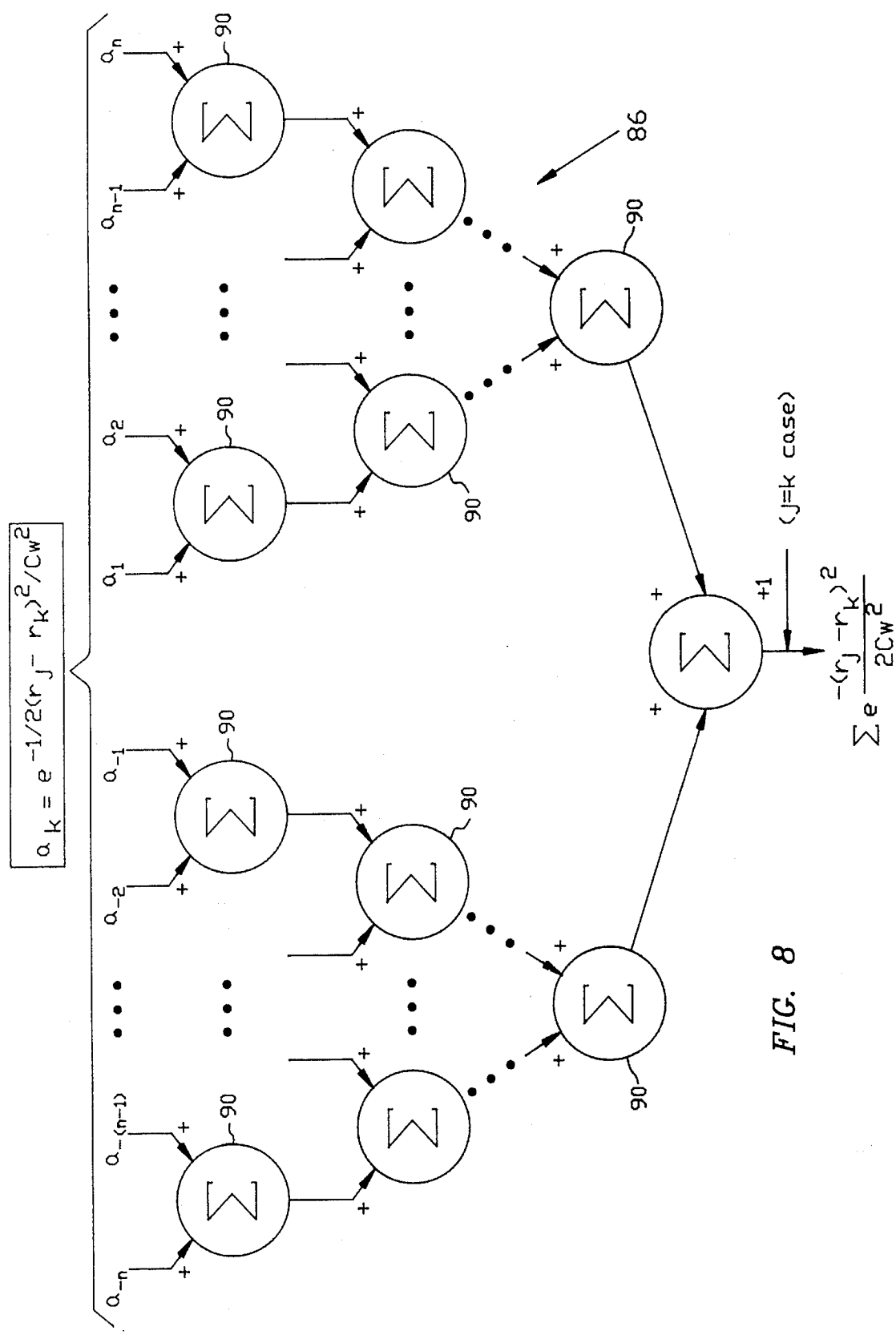
FIG. 8 shows a summing network without multipliers usable in the invention.

Referring to FIG. 8, the structure of summing network without multipliers 86 is shown. This structure outputs:

$$\sum_k [e^{-(1/2)(r_j-r_k)^2/Cw^2}]$$

for k=j−n to k=j+n.
It should be noted that in FIG. 8, the addition of the fixed summand 1 corresponds to the case where k=j.

The inputs to adders 90 of the top row of network 86 are the components of the vector:

$$<e^{-(1/2)(r_j-r_k)^2/Cw^2}>$$

described by the following notation:

$$a_k = e^{-(1/2)(r_j-r_k)^2/Cw^2}.$$

The representative structure of summing network 86 shown in FIG. 8 arises because n is the power of 2. For example, when n=8, sixteen inputs to the eight adders in the top or first row leads to eight inputs to the four adders in the second row, to four inputs to two adders in the third row, and to two inputs plus the fixed summand 1 to a single adder in the bottom or last row. Generally, if $n=2^m$, the summing network would consist of m rows of adders with $2^{m-1}$ adders in the first row, $2^{m-2}$ adders in the second row, . . . 1 adder in the m-th row which contains the fixed summand 1 as well as the two variable inputs from the m-1th row.

Figure 9:
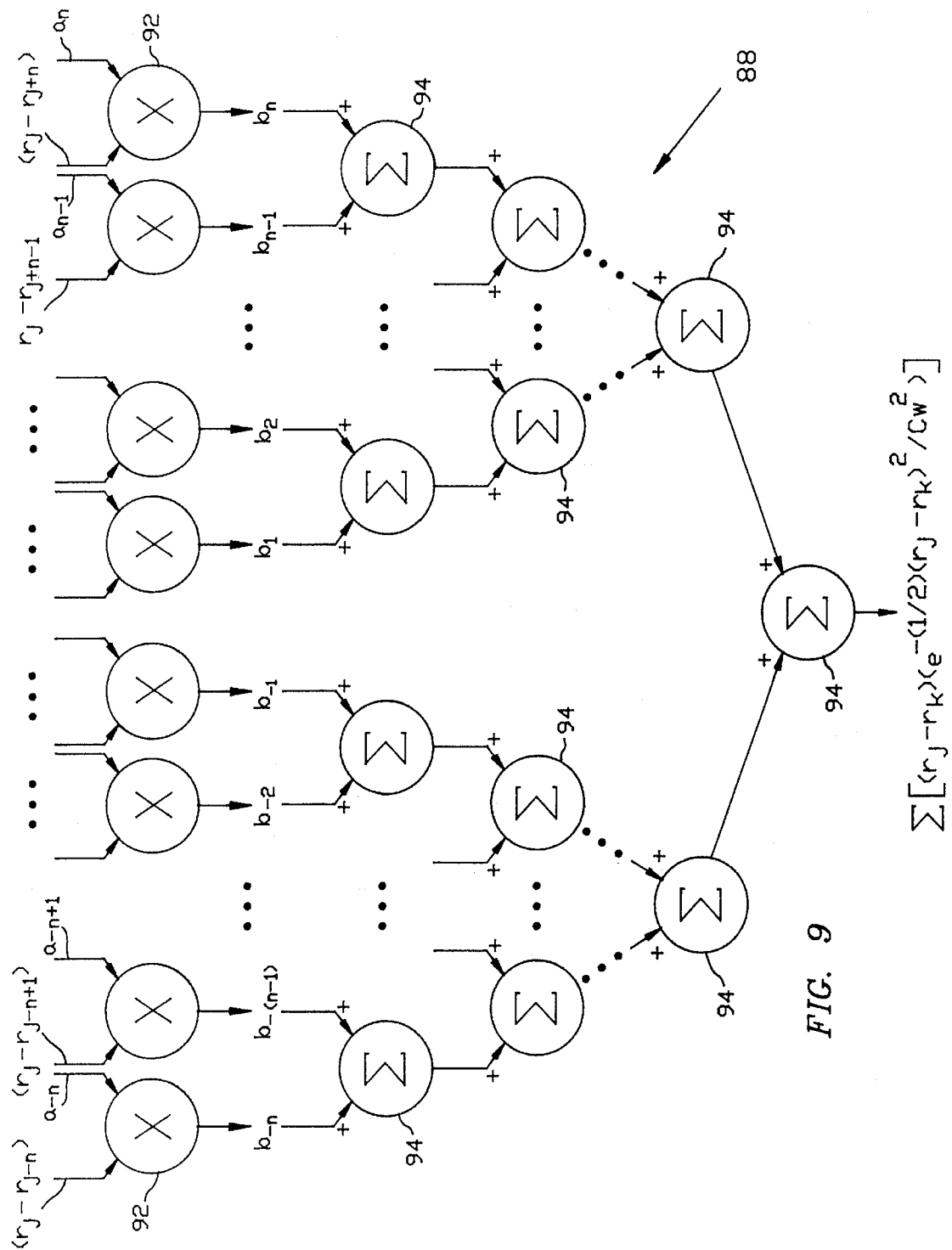
FIG. 9 illustrates a summing network with multipliers such as may be used in a representative embodiment of the invention.

In FIG. 9 the summing network with multipliers 88 is shown in detail. This summing network is substantially identical to summing network 86 but contains the addition of multipliers as will be explained. In FIG. 9 the components of the vector:

$$<(r_j-r_k)(e^{-(1/2)(r_j-r_k)^2/Cw^2})>$$

are produced by a series of multipliers 92 operating in parallel from the components of $$a_k = <e^{-(1/2)(r_j-r_k)^2/Cw^2}>$$

and $$<r_j-r_k>$$

where k=j−n to j+n.

In FIG. 9 the quantities $$b_k = (r_j-r_k)e^{-(1/2)(r_j-r_k)^2/Cw^2}$$

are input to adders 94 in the first row of adders of summing network 88. This summing network outputs:

$$\sum_k [(r_j-r_k)(e^{-(1/2)(r_j-r_k)^2/Cw^2})].$$

It should be noted that the term in this sum corresponding to j=k is always 0 so that the single adder 94 in the bottom row of summing network 88 does not contain the fixed summand 1 that was contained in the corresponding adder of the network shown in FIG. 8.

In FIG. 7 gain factor calculator 44 employing these networks is shown. It can be seen that the ratio of the outputs of summing networks 86 and 88 is taken in divider 96. This ratio is one term of the gain factor $g(r_j)$ which is multiplied by $1/Cw^2$ in multiplier 98 and summed to the second term $1/r_j$ from invertor 100, this addition occurring in summer 102. Before being inverted, $r_j$ is delayed by "n" samples in delay 39. Gain Factor Calculator 44 applies transform $g(r_j)$ to time-delayed received signal samples $(x_j, y_j)$.

Figure 10:
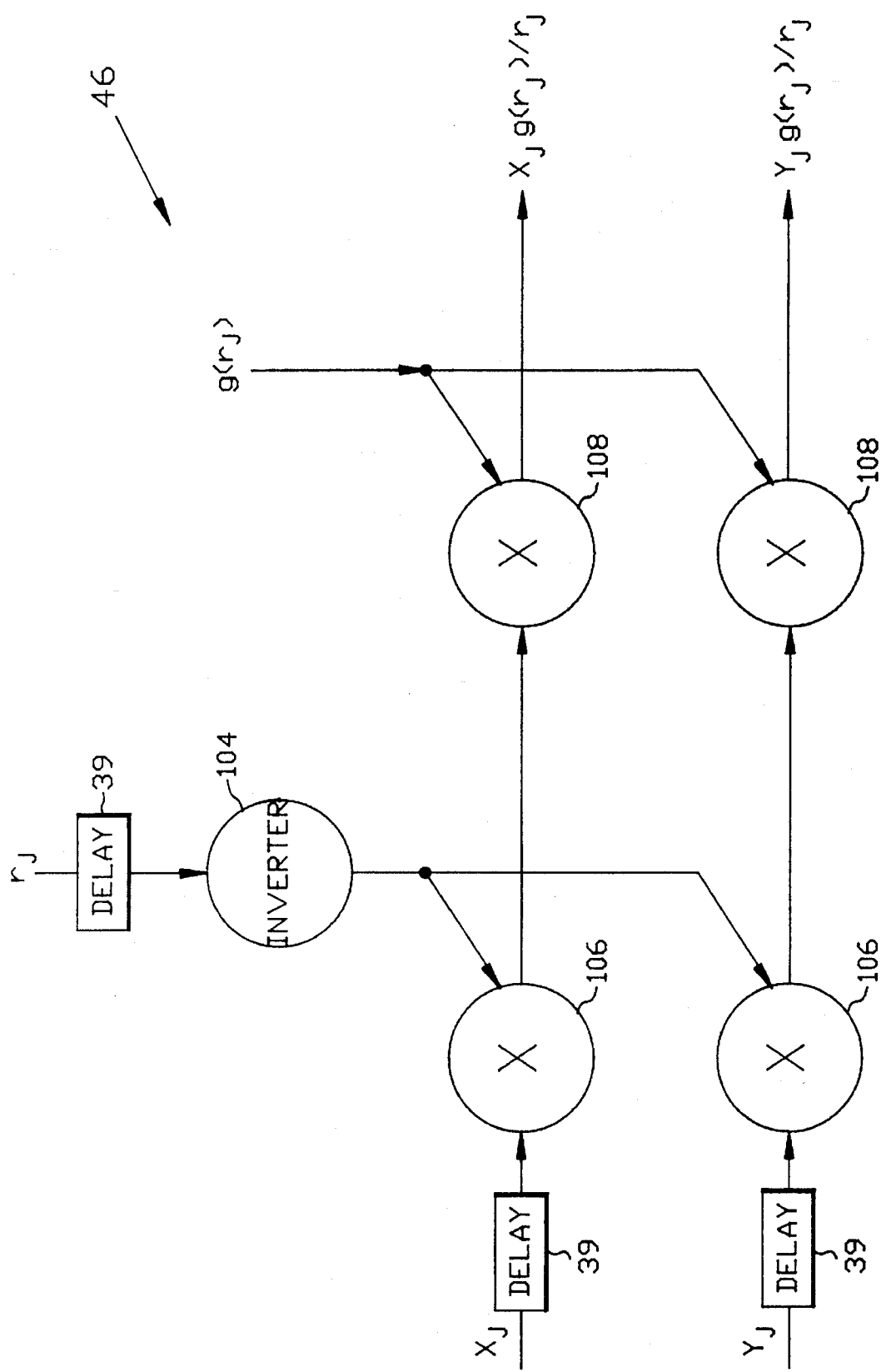
FIG. 10 is a block diagram of a gain factor applier as may be used in the invention.

Gain Factor Applier (46):

Processing in the invention is completed in Gain Factor Applier 46. In FIG. 10 it can be seen that applier 46 includes invertor 104 to obtain $1/r_j$, this to be passed to multipliers 106 to provide $(x_j/r_j, y_j/r_j)$ and then on to multipliers 108 to form the processor's output $(x_jg(r_j)/r_j, y_jg(r_j)/r_j)$ or $(x_j\hat{}, y_j\hat{})$.

The sample $(x_j, y_j)$ and magnitude $r_j$ are delayed in delays 39 to match the delay through other components of the processor of the invention.

The principle of operation of the invention will now be discussed. This operation utilizes a general technique of probability density function (PDF) estimation, known as Kernel estimation. This technique is described in the Silverman reference incorporated above.

Kernel ALOD processor 16 of interference suppression system 10 shown in FIG. 1 is structured to make use of unnormalized Gaussian kernels:

$$K(x,x_k) = e^{-(1/2)(x-x_k)^2/Cw^2}$$

with x>0 and k=j−n to k=j+n.

The parameter w is known as the window of the kernel. It should be noted that $K(x,x_k)$ is a constant times a Gaussian distribution centered about $x_k$ with variance $Cw^2$.

According to kernel estimation, for a sufficient number of samples $(x_k)$ and an appropriate choice of w, the theory of PDF estimation suggests that the summation $$\sum_{k=j-n}^{j+n} [K(x,x_k)]$$

provides an excellent approximation of the PDF of the $x_k$ up to a constant. The approximation depends only upon w and the nature of the selected kernel function.

In application to interference environments, users should experiment starting with w=the standard deviation of $x_k$ using as few samples as possible. During this experimentation, the number of samples should be slowly increased until significant improvement in performance falls off.

The Adaptive Locally Optimum Detection (ALOD) algorithm used in the invention requires the calculation of $$(d/dx)\,[\ln\{p(x)\}/x] = \frac{p'(x)}{p(x)} - \frac{1}{x}$$

where $p'(x) = \frac{d}{dx} p(x)$.

This is readily evaluated when p(x) is estimated by a sum of Gaussian kernels. In particular, $$(d/dx)[\ln\{\sum_k [K(x,x_k)]\}] = \sum_k [(d/dx)K(x,x_k)]/\sum_k [K(x,x_k)] =$$

$$-\sum_k [((x-x_k)/Cw^2)K(x,x_k)]/[\sum_k [K(x,x_k)]]$$

where the last equality follows from $$(d/dx)K(x,x_k) = -((x-x_k)/Cw^2)K(x,x_k).$$

Figure 11:
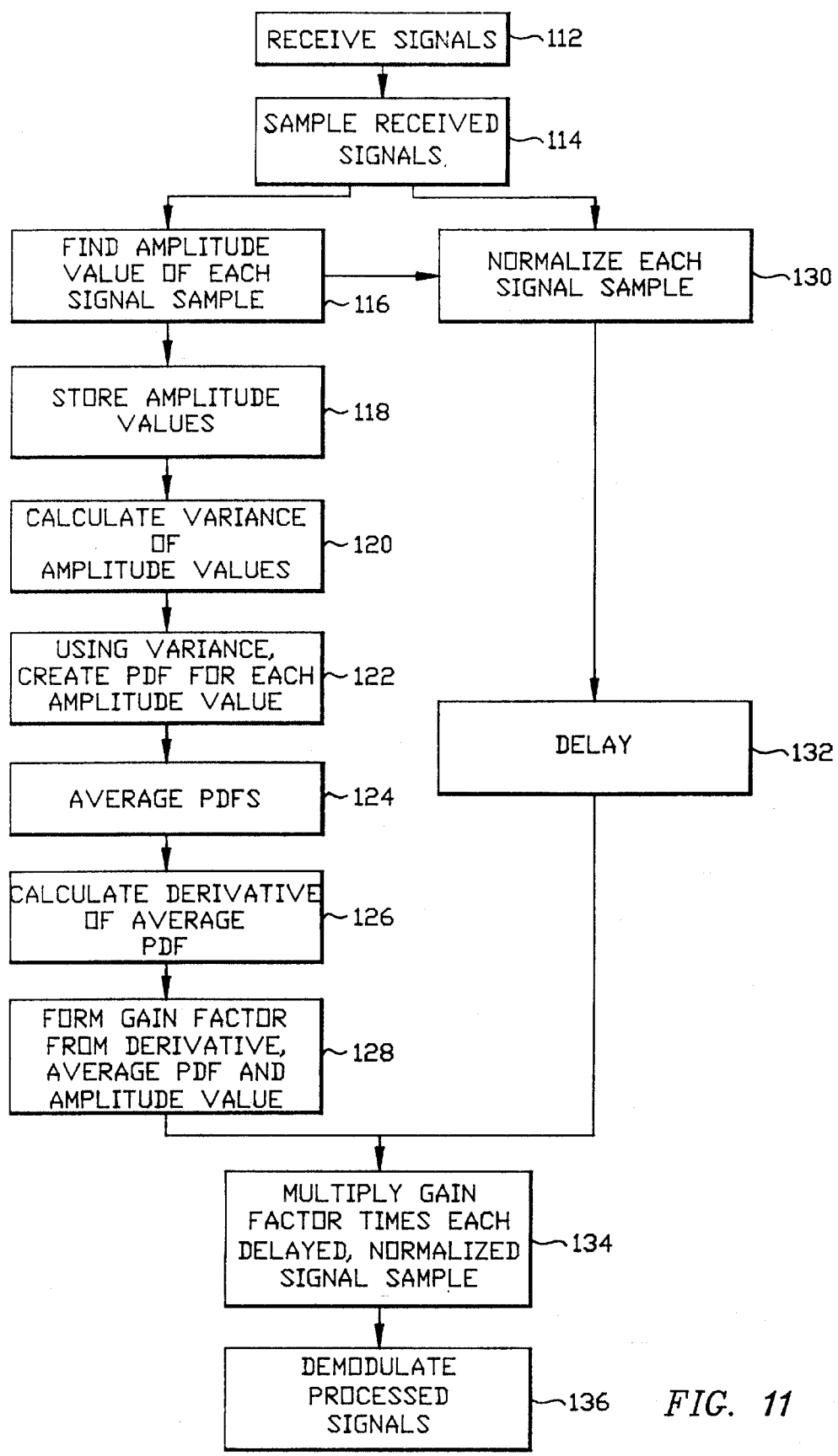
FIG. 11 is a flow chart describing various processing steps such as those that take place in a representative embodiment of the invention.

In FIG. 11, a flow chart is presented to illustrate the process of the invention. Referring to this figure in conjunction with FIGS. 1 and 2, the process of the invention begins by receiving signals in step 112. These signals, such as radio frequency signals, are received by radio receiver 12 of FIG. 1. The receive signals are then sampled in step 114 within receiver 12. The processor of the invention is then used to calculate signal magnitude values for each of the signal samples. In the invention these magnitudes or amplitudes are calculated in step 116, this calculation taking place within coordinate transformer 38 of FIG. 2. The process of the invention continues with the storing of these amplitude values, step 118, taking place jointly in Serial-to-parallel Converter 34 and Window Calculator 36. In Window Calculator 36 the variance of the amplitude values is then calculated, this shown as step 120. Weight Input Calculator 78 then uses this variance to create a probability density function for each of the amplitude values, step 122.

In Gain Factor Calculator 44, the probability density functions for each of the amplitude values are then averaged, step 124 and the derivative of the average probability function is then taken, step 126. The gain factor is then calculated from the derivative, the average probability density function and the amplitude value of the j th sample. This latter step is shown as block 128 of FIG. 11. While steps 116–128 take place, gain factor applier 46 serves to normalize each of the signal samples taken, see step 130. The normalized signal samples are delayed sufficiently, step 132, to permit processing of all samples through processor 16. In step 134, gain factor applier 46 is used to multiply the calculated gain factor times each of the delayed normalized signal samples. Gain factor adjusted signal samples are then inserted into radio demodulator 14 where the process signals are demodulated to output interference adjusted signals, step 136.

Figure 12:
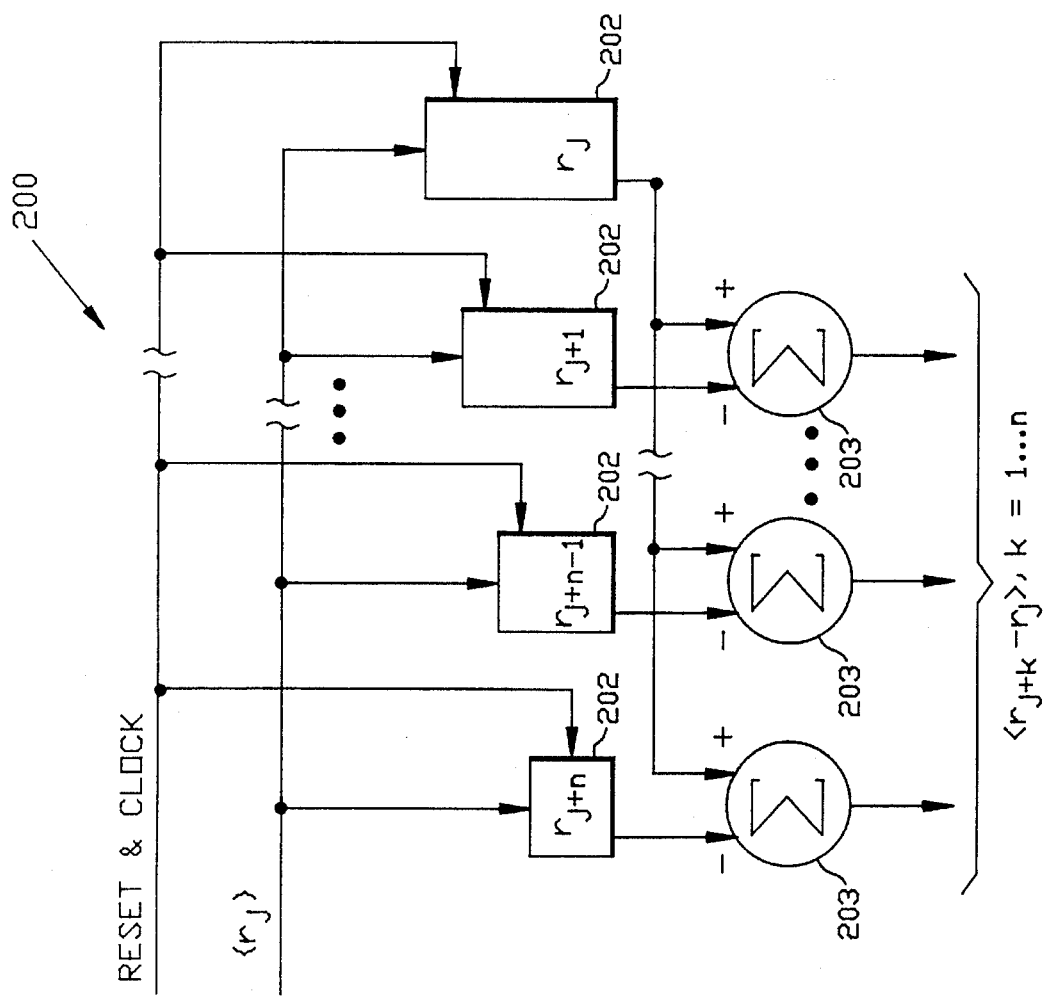
FIG. 12 is a block diagram illustration of a serial-to-parallel converter for an asymmetric kernel ALOD processor according to an alternative embodiment of the invention.
Figure 13:
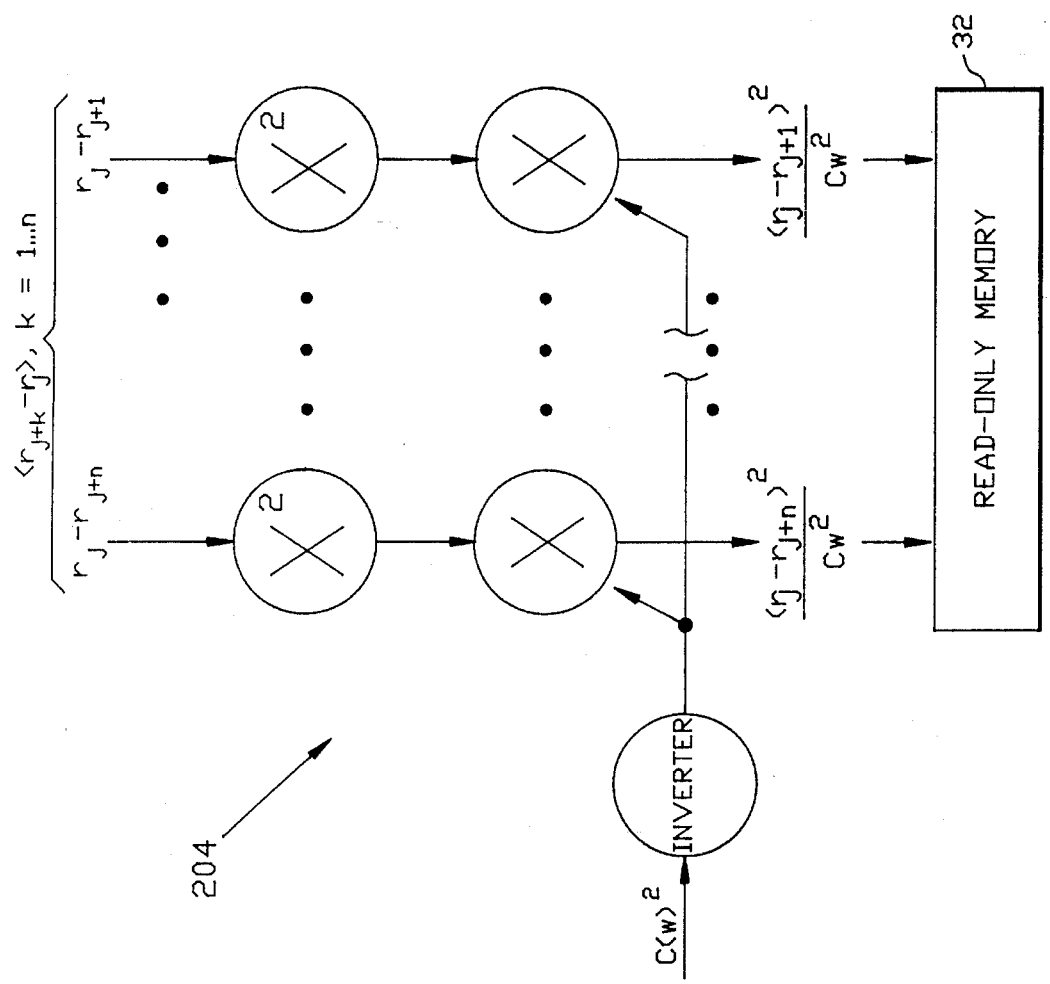
FIG. 13 illustrates a weight calculator such as may be used with the asymmetrical kernel ALOD processor according to an alternative embodiment of the invention.
Figure 14:
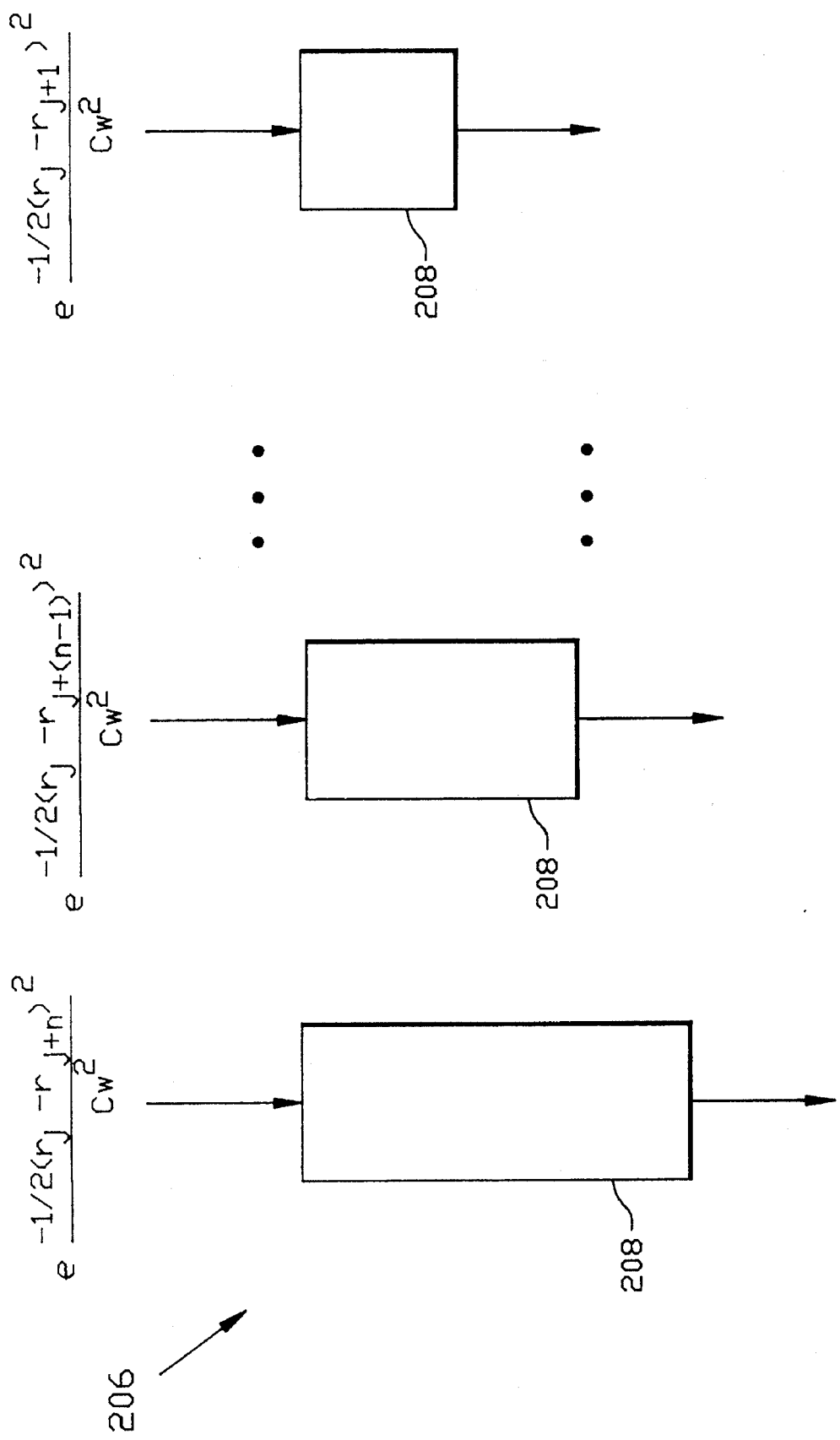
FIG. 14 is a Kernel retrieval network suitable for use in an asymmetric kernel ALOD processor according to an alternative embodiment of the invention.

Referring to FIGS. 12–14, an alternative embodiment of the invention will be described. This alternative is an asymmetric design of the Kernel ALOD Processor previously disclosed. As the kernel function $K(x_j,x_k)$ is a symmetric function, for any two variables x and y, $K(x,y)=K(y,x)$. This property of the kernel function makes possible an asymmetric design of the Kernel ALOD Processor in which fewer processor calculations are needed.

To evaluate the transform of the next sample, j+1, the kernel $K(x_{j+1},x_{j+1-1})$ is needed, which is nearly the same as $K(x_j,x_{j+1})$ because it has the form $e^{-(1/2)(x_j-x_{j+1})^2/Cw^2}$. Likewise, $K(x_j,x_{j+2})$ calculated for sample j provides an approximation of the term $K(x_{j+2},x_{j+2-2})$ needed two samples later to calculate the transform for index j+2. If past kernel evaluations are saved, then at any sample time only half as many kernel evaluations would be needed to estimate the transform for a given sample time. To incorporate these features into the basic processor of the invention, the following hardware changes need to be made:

FIG. 12 shows the structure of an Asymmetric Kernel ALOD Processor Serial-to-parallel Converter 200. Serial-to-parallel Converter 200 should be substituted for Serial-to-parallel Converter 34 of FIG. 2.

Serial-to-parallel Converter 200 consists of n+1 (rather than 2n+1) shift registers 202 of lengths 1 to n (rather than 1 to 2n). The output of the longest shift register is subtracted from the other shift register outputs in summers 203 (rather than the center shift register output from the other shift register outputs as described previously). Thus the input of Serial-to-parallel Converter 200 is $\{r_j\}$ and its output is the length n vector $<r_{j+k}-r_j>$, k=1, ... n. This output vector makes up the "top half" of the output vector of the basic invention.

The output of Serial-to-parallel Converter 200 goes to Weight Input Calculator 204 of FIG. 13. Weight Input Calculator 204 should be substituted for Weight Input Calculator 42 of FIGS. 2 and 6 for this alternative embodiment of the invention.

Referring to FIG. 13, Weight Input Calculator 204 is substantially the same as Weight Input Calculator 42 but includes n parallel normalizing paths rather than the 2n parallel normalizing paths shown in Weight Input Calculator 42. Weight Input Calculator 204 outputs $<(r_{j+k}-r_j)^2/w^2)>$, with w calculated as it was previously with this output being an n vector with k=1, ... , n.

Each of the components of the output of Weight Input Calculator 204 addresses Read-only Memory 32 also shown in FIG. 2 to output in succession the components of:

$$<e^{-x_k^2}> \text{ where } x_k=(r_{j+k}-r_j)^2/Cw^2), \text{ k=1, ... n.}$$

Referring to FIG. 14, Kernel retrieval network 206 is shown. Read-only Memory 32 should be modified to add to its output another n shift registers 208 to store the components of $\langle e^{-x_k/2}\rangle$ including half of the kernel terms used by the transform previously calculated. This enables these previously calculated kernel values to be used to provide the remaining terms needed for future transforms.

In network 206, the component $e^{-x_k/2}$ is the input to shift registers 208 of length k, k=1,2, ... n. The outputs of shift registers 208 provide the components of the vector $$\langle e^{-x_k/2}\rangle, k=-1, -2, \ldots -n.$$

The components of the two vectors $\langle e^{-x_k/2}\rangle$ for k=1, ... , n and $\langle e^{-x_k/2}\rangle$, for k=−1, ... −n provide the inputs to the summing network with multipliers 88 and summing network without multipliers 86 of Gain Factor Calculator 44 shown in detail in FIG. 7. These summing networks are the same as previously described and all remaining components of the invention are the same as before.

The invention previously described represents the probability function evaluated at $r_j$ by a sum of kernels $K(r_j,r_k)$ with the index k running from j−n to j+n. As an alternative, this probability density function can be represented by summing over the index k running from j−m to j+m' with m and m' being different integers. In particular, if only previous samples are used, m could be taken as a power of 2 and m' as 0. This choice would decrease the delay associated with the processor at the cost of estimating the probability density function in a way which uses the samples prior in time to the sample j. To implement this alternative embodiment, Serial-to-parallel Converter 34 shown in FIG. 5 and the delays used in the processor of the invention need to be adjusted for the unequal choices of m and m'. Adders are used below all the shift registers shown in FIG. 5 except the one with $r_j$. The output of the shift register line with $r_j$ is routed to all these adders to form the differences $$r_k-r_j \text{ for } k=j-m \text{ to } k=j-1 \text{ and } k=j+1 \text{ to } k=j+m'.$$

As an additional alternative, the read-only or discrete memory used to obtain the kernels $K(x,x_k)$ for k=j−n to k=j+n could be replaced by discrete components used to calculate an approximation to $e^{-(x-x_k)^2/Cw^2}$. For example, $K(x,x_k)\approx 1/(1+(x-x_k)^2/Cw^2)$.

Obviously, many modifications and variations of the invention are possible in light of the above teachings. It is therefore to be understood that within the scope of the appended claims the invention may be practiced otherwise than as has been specifically described.

What is claimed is:

1. A method comprising the steps of:

receiving signals;

taking samples of said signals;

finding a signal magnitude value of each of said signal samples;

storing said signal magnitude values;

calculating the variance of said stored magnitude values;

calculating approximations of probability density functions for each of said stored magnitude values using said variance, so that a number of probability density functions are calculated;

averaging the probability density functions calculated;

finding the derivative of the average of the probability density functions;

forming a gain factor from said derivative of the average of the probability density functions, said average of the probability density functions and one of said signal magnitude values;

normalizing each baseband signal sample taken;

multiplying said gain factor times each normalized signal sample to obtain gain factor adjusted signal samples; and inserting said gain factor adjusted signal samples into a demodulator.

2. The method of claim 1 in which said signal magnitude value is signal amplitude.

3. The method of claim 1 in which said step of calculating said probability density functions is done by addressing a memory table.

4. The method of claim 1 in which said step of calculating said probability density functions is done by calculating approximate kernels.

5. The method of claim 1 in which said signals are radio frequency signals.

6. The method of claim 1 in which said samples are baseband samples.

7. A method for interference suppression comprising the steps of:

receiving radio frequency signals;

taking baseband signal samples of said radio frequency signals;

finding a signal amplitude value of each of said baseband signal samples;

storing said signal amplitude values;

calculating the variance of said stored amplitude values;

calculating approximations of probability density functions using said variance for each of said stored amplitude values, so that a number of probability density functions are calculated;

averaging the probability density functions calculated;

finding the derivative of the average of the probability density functions;

forming a gain factor from said derivative of the average of the probability density functions, said average of the probability density functions and one of said signal amplitude values;

normalizing each baseband signal sample taken;

multiplying said gain factor times each normalized baseband signal sample to obtain gain factor adjusted signal samples; and inserting said gain factor adjusted signal samples into a radio demodulator to output interference adjusted signals.

8. The method of claim 7 in which said step of calculating said probability density functions is done by addressing a memory table.

9. The method of claim 7 in which said step of calculating said probability density functions is done by calculating approximate kernels.

* * * * *